United States Patent [19]

Hoskins et al.

[11] Patent Number: 5,756,159
[45] Date of Patent: May 26, 1998

[54] WATER ABSORBING COMPOSITIONS AND METHODS OF MAKING AND USE THEREOF

[75] Inventors: Martin G. Hoskins, Canton; Connie Hensler, Kennesaw, both of Ga.

[73] Assignee: Interface, Inc., LaGrange, Ga.

[21] Appl. No.: 822,675

[22] Filed: Mar. 24, 1997

Related U.S. Application Data

[62] Division of Ser. No. 354,676, Dec. 13, 1994, Pat. No. 5,614,269.

[51] Int. Cl.$^6$ ............................................. B05D 3/06
[52] U.S. Cl. ...................... 427/394; 427/441; 427/442
[58] Field of Search ............................. 428/441, 442, 428/375, 392, 394

[56] References Cited

U.S. PATENT DOCUMENTS

| | | |
|---|---|---|
| 4,125,644 | 11/1978 | Ketley et al. . |
| 4,324,575 | 4/1982 | Levy . |
| 4,479,984 | 10/1984 | Levy et al. . |
| 4,522,465 | 6/1985 | Bishop et al. . |
| 4,738,867 | 4/1988 | Itoh et al. . |
| 4,741,597 | 5/1988 | Broer . |
| 4,741,958 | 5/1988 | Bishop . |
| 4,770,898 | 9/1988 | Sugai et al. . |
| 4,798,852 | 1/1989 | Zimmerman et al. . |
| 4,867,526 | 9/1989 | Arroyo . |
| 4,892,754 | 1/1990 | Itoh et al. ................................. 427/54.1 |
| 4,909,592 | 3/1990 | Arroyo et al. . |
| 5,082,347 | 1/1992 | Akasaka et al. . |
| 5,179,619 | 1/1993 | Bosisio et al. . |
| 5,182,786 | 1/1993 | Kinaga et al. . |
| 5,199,098 | 3/1993 | Nolan et al. . |
| 5,244,934 | 9/1993 | Umeda et al. ............................ 522/129 |

FOREIGN PATENT DOCUMENTS 62-225507  10/1987  Japan .

*Primary Examiner*—Erma Cameron
*Attorney, Agent, or Firm*—Jones & Askew

[57] ABSTRACT

A water absorptive composition comprising, a fibrous substrate impregnated with a water absorptive, water insoluble polymer, wherein the polymer is intertwined and interlocked with fibers of the fibrous substrate, and the composition has high water absorbing capacity, a method of making thereof, and a cable, more particularly a fiber optic cable, made therewith.

8 Claims, No Drawings

WATER ABSORBING COMPOSITIONS AND METHODS OF MAKING AND USE THEREOF

This is a divisional application of application Ser. No. 08/354,676, filed Dec. 13, 1994 now U.S. Pat. No. 5,614, 269.

TECHNICAL FIELD OF THE INVENTION

The present invention relates to water absorbing compositions, and methods of making thereof, comprising a fibrous substrate and a water absorptive polymeric material. These compositions have utility in the cable industry, particularly the optic fiber cable industry.

BACKGROUND OF THE INVENTION

A substantial and persistent problem in the cable industry is the ingress of moisture and water into the cable. Such ingress often results from changes in ambient conditions which cause differences in vapor pressure between the inside and the outside of a cable jacket. Consequently, moisture tends to diffuse in a unidirectional manner from the outside of the cable to the inside of the cable, resulting in an undesirably high moisture level inside the cable. High levels of condensed moisture inside a cable sheath system may have a detrimental effect on the transmission characteristics of a metallic conductor cable.

Furthermore, water may enter the cable as a result of damage to the cable which perforates the external water barrier elements. For example, animal attacks and mechanical impacts often create openings in the sheath system of the cable, which allows water to enter the cable. Once inside the cable sheath system, the water tends to move longitudinally along the cable into splice closures, if not controlled.

With respect to optical fiber cable, while the presence of water itself within the cable is not necessarily detrimental to its performance, passage of the water along the cable interior to splice junctions or terminals or associated equipment inside closures, for example, may cause problems especially in freezing environments.

Cables for transmitting communications signals must meet industry standards with respect to water blocking provisions. For example, one industry standard requires that there be no transmission of water under a pressure head of one meter in one hour through a one meter length of cable. Thus, there are numerous technical and commercial reasons to develop and implement effective water blocking compositions to be used in the cable industry.

In the prior art, various techniques have been used to prevent the ingress of water through the sheath system of a cable and along the core. For example, a metallic shield used to protect a metallic conductor cable against lightning and rodent attacks is provided with a sealed longitudinal seam. Forming of a shield about a cable core requires the use of relatively low manufacturing line speeds. Also, the use of a metallic shield is destructive of the otherwise all-dielectric property of an optical fiber cable.

Because lightning strikes may cause holes in a metallic shield, it is not uncommon to include additional provisions for preventing the ingress of water into the core. Water blocking materials have been used to fill cable cores and to coat portions of cable sheath systems to prevent the movement longitudinally thereof of any water which enters the cable. Although the use of a filling material, in the form of a grease, causes housekeeping problems, inhibits line speeds because of the need to fill carefully interstices of the cable core and presents problems for field personnel during splicing operations, for example, it continues to be used to prevent entry of the water into the core.

Another approach involves the use of a water swellable tape within the cable sheath system. The tape is used to prevent the travel of water through the sheath system as well as blocking its travel longitudinally along the cable to closures and termination points, for example. Such a tape generally is laminated, including a water swellable powder which is trapped between two non-woven tissues. Although such a tape provides suitable water protection for the cable it is relatively expensive and thick. If the tape is too thick, the diameter of the cable is increased, thereby causing problems in terminating the cable with standard size hardware. Another drawback to this tape is the problems associated with its delamination.

U.S. Pat. No. 4,867,526, discloses a cable having water blocking provisions wherein an elongated substrate member which comprises an impregnated non-metallic, non-woven, web-like material in the form of a tape is interposed between a core and a jacket. The impregnating material may comprise a film of a water swelling or so-called superabsorbent material. The water blocking substrate member is impregnated with a material which is held in the non-woven, web-like member in suspension without its being reacted. When exposed to water, the impregnating material reacts to swell and cause the tape to prevent the passage of water through the sheath system toward the core and its migration in a direction longitudinally along the cable.

A drawback to this composition is that the impregnating material may become loose and dislodged from the substrate. The water absorbing material often is lost during its application to the cable, thus reducing its ability to block water uniformly along its entire length. Yet another disadvantage of this water absorbing composition is its high cost of production due to the relatively high level of moisture that must be driven off.

Another approach to inhibiting the ingress of water involves including in a cable a water blocking yarn interposed between a core tube and an outer surface of a jacket of the cable's sheath system. The yarn extends linearly along the cable or may be wrapped helically about a portion of the sheath system. The yarn may be one which is composed of a superabsorbent fiber material which upon contact with water swells and inhibits the movement of water within the cable. Such yarns generally lack the tensile strength and thickness required for inclusion into cable. Additionally, absorbancy tends to be minimal.

U.S. Pat. No. 4,738,867 discloses a process for preparing a water absorptive composite material by:

(a) applying an aqueous solution of a polymerizable monomer comprising as a main component acrylic acid, of which 20% or more of the carboxyl groups have been neutralized to its alkali metal salt or ammonium salt, to a prefabricated fibrous substrate, (b) polymerizing the polymerizable monomers applied to said fibrous substrate by means of a water-soluble radical polymerization initiator to form a composite of a polymer derived from said polymerizable monomer and said fibrous substrate, and (c) irradiating said composite with electromagnetic radiation or corpuscular ionizing radiation to obtain a water absorptive composite of which the water absorption velocity is enhanced as compared with the composite from step(b).

This process requires two distinct polymerization steps, and further requires that the second, high energy level polymerization result in an enhanced absorption velocity of the final product relative to the composite resulting from the first polymerization step.

Consequently, there remains a long felt and unfulfilled need in the cable industry for an effective yet inexpensive water blocking composition that is easy to handle and facilitates fast line speeds. A further need is for a water blocking composition that is not bulky or heavy so as to help maintain cable size and weight at a minimum. A desirable water blocking composition also would not pose the potential problems associated with delamination or loss of water absorbing material upon application to the cable. A water absorbing composition and method is also needed where the water absorbing material add on weight can be accurately controlled and will be maintained in the composition through subsequent processing and handling.

SUMMARY OF THE INVENTION

The present invention relates to a water absorbing composition comprising a fibrous substrate impregnated with a water absorptive, water insoluble polymer, wherein the polymer is intertwined and interlocked with fibers of the fibrous substrate, and wherein the water absorptive composition is essentially non-toxic. The present invention further relates to a method of making a water absorptive, water insoluble composition comprising the steps of (1) impregnating a fibrous substrate with a solution capable of polymerizing upon exposure to UV irradiation to form a water absorptive polymer; and (2) exposing the impregnated fibrous substrate to UV irradiation to polymerize the solution to form a substrate impregnated with a water absorptive, water insoluble polymer, wherein the polymer is intertwined and interlocked with fibers of the fibrous substrate, and wherein the water absorptive composition is essentially non-toxic, and the composition formed thereby. The present invention further encompasses a cable comprising, a water absorptive composition comprising a fibrous substrate impregnated with a water absorptive, water insoluble polymer, wherein the polymer is intertwined and interlocked with fibers of the fibrous substrate, and wherein the water absorptive composition is essentially non-toxic.

It is an object of the present invention to provide a composition and method of making thereof, that is effective at blocking water and absorbing moisture in cables, yet inexpensive and easy to handle, and which facilitates fast line speeds.

An advantage of the present invention is that the water blocking composition made by the disclosed method is not bulky or heavy, thus allowing cable size and weight to be maintained at a minimum. A further advantage of the present invention is that the water blocking composition made by the disclosed method does not suffer from problems associated with delamination or substantial loss of water absorbing material during handling and application to the cable. Yet another advantage of the present invention is that it is essentially non-toxic and thereby reduces workers to hazardous health risks. Still another of the present invention is that the method of making water absorptive, water insoluble polymers is rapid, straightforward, and economical.

A feature of the composition of the present invention is that the water absorbing material is polymeric in nature, and that the water absorbing polymer is intertwined with the fibers of the substrate such that it becomes an intimately and integrally associated with the substrate.

A feature of the method of the present invention is that a fibrous substrate is impregnated with a solution capable of polymerizing upon exposure to UV irradiation to form a water absorptive, water insoluble polymer, prior to polymerization of the water absorbing material. The polymer is subsequently formed in the presence of the fibrous substrate such that the polymeric structure of the water blocking material intertwines with, and is locked in place by, the fibers of the substrate.

Another feature of the composition and method of the present invention is that the add on weight of the water absorbing material can be accurately controlled, and that the resulting composition is highly water absorbent.

Yet another feature of the present invention is that the residual free monomer concentration is very low, less than about 200 ppm.

Still another feature of the present invention is that the polymerization is a single step.

These and other objects, advantages and features of the present invention are more fully described in the following description.

DETAILED DESCRIPTION OF THE INVENTION

The present invention encompasses a water absorbing composition comprising, a fibrous substrate impregnated with a water absorptive, water insoluble polymer, wherein the water absorptive, water insoluble polymer is intertwined and interlocked with fibers of the fibrous substrate, and a method of making a water absorptive composition comprising the steps of (1) impregnating a fibrous substrate with a solution capable of polymerizing upon exposure to UV irradiation to form a water absorptive, water insoluble polymer and (2) exposing the impregnated fibrous substrate to UV irradiation to polymerize the solution therein to form a polymer, wherein the water absorptive, water insoluble polymer is intertwined and interlocked with fibers of the fibrous substrate. The present invention also relates to cables that contain a water absorbing composition comprising, a fibrous substrate impregnated with a water absorptive, water insoluble polymer, wherein the polymer is intertwined and interlocked with fibers of the fibrous substrate.

More particularly, the invention relates to combining monomers of super absorbent polymers (SAPs) with ultraviolet light-dependent free-radical generators in solution, applying this solution to a fibrous substrate such as a woven or nonwoven fabric, and exposing the monomer impregnated fibrous substrate to UV light to initiate a polymerization reaction. Polymerization of the SAP monomers occurs in and among the interstices of the fibers of the fibrous substrate to form a polymeric structure wherein the polymer is intertwined and interlocked with fibers of the fibrous substrate. The method of the invention requires only a single irradiation step to polymerize and cure the water absorptive, water insoluble polymers in the composition. Accordingly, the method is rapid, straightforward and economical.

The water absorbing composition thus formed is highly water absorptive—capable of absorbing at least 100 grams of distilled water per gram of polymer, more preferably at least 200 grams of distilled water per gram of polymer. Additionally, the water absorbing composition is relatively thin and light weight because it is not laminated, and does not lose appreciable water absorbing material upon handling and application to the cable. These advantages are the direct result of the intimate structural relationship achieved by polymerizing SAP monomers in situ in the fibrous substrate.

The water absorbing composition made by this method is a single structure wherein the network of fibers of the substrate and the network of polymeric chains of water absorbing material are interlaced, intertwined and interlocked. The water absorbing material is therefore, integrally, tightly and permanently associated with the fibrous substrate.

The method of the present invention permits very accurate control of the add on weight of the water absorbing material to the fibrous substrate. Consequently, the water absorbing compositions made thereby are uniform with respect to the amount of water absorbing material contained per unit length of substrate along its entire length.

Furthermore, the add-on weight per unit length may be easily adjusted to form, for example, a continuous water absorbing tape or yarn wherein specific portions of the tape or yarn contain more or less water absorbing material than the rest of the composition. Such compositions having variable water absorptive characteristics may have specialized utility in the cable industry. For example, increased water absorptive capacity may be desirable at the ends of predetermined lengths of cable, or in the vicinity of the splice junction, terminals or other connections involving the cable.

Various water absorbing compositions made according to the method of the present invention are useful in the fiber optic cable or wire industry to control the ingress and movement of water in the cable.

Fibrous substrates used in the invention may be either woven or non-woven, including woven or non-woven polyester, woven or non-woven fiberglass, or any other fibrous substrate that can be coated with a water based solution. Examples of polyester fibrous substrates include spun-bonded polyester and polyester yarns. Yarns useful in the present invention may also be made of other polymers such as nylon and kevlar.

Water absorbing monomers capable of polymerizing in the presence of UV light-dependent polymerization initiators and UV irradiation include, for example, monomers of polyacrylamide, monomers of acrylic acid neutralized to approximately 60 molar to 100 molar percent with an alkali metal such as sodium or potassium, and monomers of polyacrylamide-acrylic acid copolymers. The compositions resulting after polymerization is a fibrous substrate having integrally associated therewith a water absorbing polymer such as polyacrylamide, polymers of acrylic acid neutralized to approximately 60 molar to 100 molar percent with an alkali metal, and polyacrylamide-acrylic acid copolymers.

Crosslinking reagents instrumental in propagating the polymerization and forming a branched network of polymers include, for example, N, N-methylene bis acrylamide (NMBA), polyethylene glycol diacrylate (PEGDA) and polyethylene glycol dimethacrylate (PEGDMA).

UV-dependent photoinitiators of polymerization useful in the present invention are water soluble or water dispersible compounds that generate free radicals upon exposure to UV irradiation. Examples of such polymerization initiators include, 4-benzoyl-N, N-dimethyl-N-(2-(1-oxo-2-propenyloxy)ethyl) benzenemethananaminium bromide (available commercially as Quantacure ABQ) in combination with N-methyl-diethanolamine (NMDEA), and 2-hydroxy-2-methyl-1-phenyl-1-propanone (available commercially as Darocure 1173).

A humectant may optionally be added to the water absorbing composition of the present invention. Examples of such humectants include glycerine or water soluble glycols such as polyethylene glycol, and polypropylene glycol.

A surfactant may optionally be added to facilitate wetting of fibers in the fibrous substrate so that the water absorbing solution capable of polymerizing upon exposure to UV irradiation to form a water absorptive, water insoluble polymer is sufficiently in contact with the fibers to ensure effective intertwining and interlacing of the polymers with the fibers of the substrate. An example of a surfactant useful with fiberglass fibrous substrates is alcohol ethoxy sulfate, available under the tradename Sterol CS-460 from Van Waters & Rogers, Inc.

The ranges of specific amounts of the various components that form the water absorbing solution capable of polymerizing upon exposure to UV irradiation to form a water absorptive, water insoluble polymer are as follows.

| Concentration Ranges | Range | Desirable |
| --- | --- | --- |
| acrylamide to acrylic acid ratio | 0–50% by weight | 0% |
| % solids of final formulation | 25–50% | 45% |
| Alkali metal hydroxide | 60–100% neutralization of acrylic acid | 98–100% |
| UV initiator[1] (Quantacure ABQ, available from Biddle Sawyer) | 0.25–4% | 0.5% |
| N-Methyl Diethanol Amine | 0–2% | 1.0% |
| Crosslinker[1] (PEGDA) | 0–1% | 0.16% |
| Humectant[1] (Glycerine) | 0–7.5% | 2.5% |
| Wetting Agent[1] (Steol CS-460) | 0–1.5% | 0.45% |

[1]Percentage concentration based on combined weight of water, acrylic acid, acrylamide, and alkali metal hydroxide.

It was discovered unexpectedly that the water absorbing compositions of the present invention could be cured with a substantial amount of water still in the composition when made with an exclusively water-based system. In contrast, most if not all other UV curable water-based water absorbing compositions, for example those made with urethane or acrylics, require applying the UV curable dispersion to the substrate, drying and subsequently curing the composition by exposure to UV light. Furthermore, drying the composition of the present invention prior to UV curing results in the formation of a finely divided white powder that does not react upon exposure to UV light. A complication associated with the wet curing process of the present invention is that the UV lights expose the reactive monomer mixture to substantial infrared radiation causing the monomer mixture to heat up. This can lead to boiling of the mixture and the formation of undesirable gas bubbles which scatter the UV light and thus reduce curing efficiency. Additionally, the rate of curing is temperature dependent and thus uncontrolled heating of the monomer mixture necessitates changes in line speed or other reaction parameters. Consequently, care must be taken to control the temperature of the monomer mixture.

It was also the found that the distance of UV lights from the polymerizing water absorbing material was instrumental in changing the character of the polymeric structure formed. For example, when the UV lamps were less than 18 inches away from the monomer impregnated substrate the polymeric chains formed were short, resulting in a structure that was water soluble. In contrast, when the UV lamps were moved to 18 inches away from the monomer impregnated substrate, the polymeric chains were long, resulting in water insolubility and high water absorbing capacity. Distances of greater than 18 inches may be used, however, the intensity of the UV radiation diminishes and line speed must be adjusted accordingly to ensure that water absorptive, water insoluble polymers are formed. Additionally, increased production line speed may be achieved by increasing the number or intensity of the UV lamps utilized. Generally the UV intensity useful for curing the super absorbing compositions of the present invention will range from 20 watts/inch to 700 watts/inch, and will result in the formation of a water absorptive, water insoluble polymer.

Another surprising and unexpected discovery was that formulations containing high monomer percent solids result in the formation of a water absorptive composition that is essentially non-toxic, i.e. has a residual free monomer concentration of less than about 200 ppm. For example when potassium acrylamide was added to 45% total solids of the formulation, the resulting polymer had low residual free monomer. In contrast, when the monomer percent solids was reduced to, for example, 30%, the amount of free monomer in the composition increased. High levels of residual free monomer pose a substantial health hazard for workers.

It was also found that the water absorbing capacity of the composition could be dramatically increased by alkali neutralization of the monomer formulation prior to impregnation of the fibrous substrate. While acceptable water absorbing compositions of the present invention have been made with up to 5000 ppm residual free monomer in the cured product, it is more desirable to produce super absorbing polymers having a concentration of less than 100 ppm free monomer to minimize worker health risks. The methods and compositions of the present invention permit production of water-absorbing compositions having less than 100 ppm free monomer.

The water absorbing composition according to the present invention can be, for example, yarns or tapes or sheets depending upon the particular dimensions and characteristics of the fibrous substrate utilized. Generally tapes of various widths are be cut from wider production stock by methods well known in the art. The yarns and tapes according to the present invention are incorporated into cables, generally being interposed between the core and the external sheath, covering or jacket. The yarns and tapes may incorporated by helically wrapping the yarn or tape longitudinally along the axis of the cable core. Alternatively the water absorbing yarns or tapes may run in a linear longitudinal direction along the axis of the cable. The water absorbing of the present invention may also be incorporated in cables by concentric multi-layered wrapping at splice junctions, terminals and other connections. Various other methods of incorporating the water absorbing composition of the present invention are well known to those skilled in the art.

The invention is further described by the following examples.

EXAMPLE 1

To a reactor equipped with good agitation and cooling capable of maintaining the reaction temperature below 40° C., add 44 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1.1 parts Quantacure ABQ, 2.2 parts NMDEA, 0.35 parts PEGDA, and 5.5 parts Glycerine and agitate for 15 minutes. This procedure yields a 45% solids UV curable SAP monomer solution.

The resulting solution was used to impregnate a 6.8 mil, 6.03 oz/yd$^2$ woven fiberglass. The impregnated fiberglass was then exposed to four 300 watt/inch mercury arc UV curing lamps. The lamps were arranged with two lamps above the fabric and two below. The lamps were equipped with eliptical reflectors and located 18 inches from the material. The lamps were arranged with a horizontal offset of 2 feet from the center of the one bulb to the center of the next. The impregnated material was passed through this exposure at a speed of 8 feet/minute. After exiting the lamps, the material passed through a 30 foot convection drying oven set at a temperature of 260° F. The moisture of the final composition was <5%. The final composition was approximately 35% polymer by weight and has the capability to absorb 250 grams of distilled water/gram of polymer with a free monomer content of approximately 60 ppm based on final composition weight. The low monomer content reduces worker exposure and associated health risks during cable manufacturing.

EXAMPLE 2

To a reactor equipped with good agitation and cooling capable of maintaining the reaction temperature below 40° C., add 200 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1 part Darocure 1173, available from Ciba-Geigy Corp., and 0.6 parts NMBA and agitate for 15 minutes. This procedure yields a 27% solids UV curable SAP monomer solution.

The resulting solution was used to impregnate a 6.8 mil, 6.03 oz/yd$^2$ woven fiberglass. The impregnated fiberglass was then exposed to four 300 watt/inch mercury arc UV curing lamps. The lamps were arranged with two lamps above the fabric and two below. The lamps were equipped with eliptical reflectors and located 18 inches from the material. The lamps were arranged with a horizontal offset of 2 feet from the center of one bulb to the center of the next. The material was passed through this exposure at a speed of 8 feet/minute. After exiting the lamps, the material passed through a 30 foot convection drying oven set at a temperature of 260° F. The moisture of the final composition was <5%. The final composition is approximately 23% polymer by weight and has the capability to absorb 200 grams of distilled water/gram of polymer with a free monomer content of approximately 500 ppm based on final composition weight.

EXAMPLE 3

To a reactor equipped with good agitation and cooling capable of maintaining the reaction temperature below 40° C., add 44 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1.1 parts Quantacure ABQ, 2.2 parts NMDEA, 0.35 parts PEGDA, and 5.5 parts Glycerine and agitate for 15 minutes. This procedure will yield a 45% solids UV curable SAP monomer solution.

The resulting solution was used to impregnate a 4.0 mil, 0.5 oz/yd$^2$ nonwoven polyester. The impregnated polyester was then exposed to two 125 watt/inch and then two 300 watt/inch mercury arc UV curing lamps. The lamps were arranged with two lamps above the fabric and two below. The lamps were equipped with eliptical reflectors and located 18 inches from the material. The lamps were arranged with a horizontal offset of 2 feet from the center of one bulb to the center of the next. The material was passed through this exposure at a speed of 11 feet/minute. After exiting the lamps, the material passed through a 30 foot convection drying oven set at a temperature of 260° F. The moisture of the final composition is <5%. The final composition is approximately 82% polymer by weight and has the capability to absorb 250 grams of distilled water/gram of polymer with a free monomer content of approximately 95 ppm based on final composition weight.

EXAMPLE 4

To a reactor equipped with good agitation and cooling capable of maintaining the reaction temperature below 40° C., add 200 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1 part Darocure 1173, and 0.6 parts NMBA and agitate for 15 minutes. This procedure will yield a 27% solids UV curable SAP monomer solution.

The resulting solution was used to impregnate a 4.0 mi, 0.5 oz/yd$^2$ nonwoven polyester. The impregnated polyester was then exposed to two 125 watt/inch and then two 300 watt/inch mercury arc UV curing lamps. The lamps were arranged with a 125 watt and a 300 watt lamp above the fabric and the remaining two lamps below. The lamps were equipped with eliptical reflectors and located 18 inches from the material. The lamps were arranged with a horizontal offset of 2 feet from the center of one bulb to the center of the next. The material was passed through this exposure at a speed of 8 feet/minute. After exiting the lamps, the material passed through a 30 foot convection drying oven set at a temperature of 260° F. The moisture of the final composition is <5%. The final composition is approximately 55% polymer by weight and has the capability to absorb 200 grams of distilled water/gram of polymer with a free monomer content of approximately 1000 ppm based on final composition weight.

EXAMPLE 5

The importance of utilizing the proper intensity of UV light in the formation of the composition is illustrated by the following results, which were obtained at various UV light distances. The UV lamp was 300 watts/inch. The line speed was 8 fpm. The Fibrous substrate was the fiberglass stated in Example 1. The following formulation was used:

| Water | 200 |
| Acrylic Acid | 66 |
| 45% Potassium Hydroxide | 110 |

-continued

| Steol CS-460 | 1 |
| Darocure 1173 | .6 |
| NMBA | 1 |

| Lamp Distance | Water absorbance/gram of polymer |
| --- | --- |
| 2.1 inches (focal point) | 30 |
| 9 inches | 100 |
| 18 inches | 200 |

The increase in the water absorbancy per gram of polymer as a result of moving the UV lamps to 18 inches from the monomer impregnated fibrous substrate was dramatic and unexpected.

It is to be understood that the foregoing description is non-limiting and intended to further illustrate the present invention such that one skilled in the art can practice the invention and determine the metes and bounds of the appended claims. Other embodiments of the present invention will be apparent to one skilled in the art, and are intended to be encompassed by the appended claims.

We claim:

1. A water absorptive article comprising, a fibrous substrate impregnated with a water absorptive, water insoluble, UV polymerizable polymer selected from the group consisting of polyacrylamide, polymers of acrylic acid neutralized to approximately 60 molar to 100 molar percent with an alkali metal, and polyacrylamide-acrylic acid copolymers, wherein the polymer is intertwined and interlocked with fibers of the fibrous substrate, and wherein the water absorptive composition is essentially non-toxic.

2. The article of claim 1 wherein the fibrous substrate is fiberglass, the water absorptive capacity is at least 200 grams distilled water per gram of polymers and the residual free monomer is less than 100 ppm.

3. A water absorptive article made by the process comprising the steps of, impregnating a fibrous substrate with a solution capable of polymerizing upon exposure to UV irradiation to form a water absorptive polymer selected from the group consisting of polyacrylamide, polymers of acrylic acid neutralized to approximately 60 molar to 100 molar percent with an alkali metal, and polyacrylamide-acrylic acid copolymers;

exposing the impregnated fibrous substrate to UV irradiation to polymerize the solution therein to form the polymer, wherein the water absorptive polymer is intertwined and interlocked with fibers of the fibrous substrate, and wherein the water absorptive article is essentially non-toxic.

4. The article of claim 3 wherein the UV irradiation is provided by 4 300 watt/inch UV lamps housed in elliptical reflectors located 18 inches from the fibrous substrate impregnated with the polymerizable solution, wherein two lamps are above and two lamps are below the substrate.

5. The article of claim 3 wherein the fibrous substrate is fiberglass, the water absorptive capacity is at least 200 grams distilled water per gram of polymer, and the residual free monomer is less than 100 ppm.

6. A cable comprising;

a sheath;

a core within the sheath; and a water absorptive article disposed in the sheath between the sheath and the core and comprising a fibrous substrate impregnated with a water absorptive water insoluble, UV polymerizable polymer selected from the group consisting of polyacrylamide, polymers of acrylic acid neutralized to approximately 60 molar to 100 molar percent with an alkali-metal, and polyacrylamide-acrylic acid copolymers, wherein the water absorptive polymer is intertwined and interlocked with fibers of the fibrous substrate, and wherein the water absorptive article is essentially non-toxic.

7. The cable of claim 6, wherein the fibrous substrate is fiberglass, the water absorptive capacity is at least 200 grams distilled water per gram of polymer, and the residual free monomer is less than 100 ppm.

8. The cable of claim 6, wherein the cable is a fiber optic cable.

* * * * *